(12) United States Patent
Ko

(10) Patent No.: US 9,048,705 B2
(45) Date of Patent: Jun. 2, 2015

(54) WIND POWER GENERATING APPARATUS HAVING A WIND GUIDE

(76) Inventor: Young-Eun Ko, Gimpo-Si (KR)

( * ) Notice: Subject to any disclaimer, the term of this patent is extended or adjusted under 35 U.S.C. 154(b) by 72 days.

(21) Appl. No.: 13/981,325

(22) PCT Filed: Jan. 17, 2012

(86) PCT No.: PCT/KR2012/000389
§ 371 (c)(1),
(2), (4) Date: Jul. 24, 2013

(87) PCT Pub. No.: WO2012/105759
PCT Pub. Date: Aug. 9, 2012

(65) Prior Publication Data
US 2013/0307276 A1    Nov. 21, 2013

(30) Foreign Application Priority Data

Feb. 1, 2011  (KR) .................. 10-2011-0009960
Dec. 1, 2011  (KR) .................. 10-2011-0127753

(51) Int. Cl.
| F03D 9/00 | (2006.01) |
| H02K 7/18 | (2006.01) |
| F03D 3/00 | (2006.01) |
| F03D 3/02 | (2006.01) |
| F03D 3/04 | (2006.01) |

(52) U.S. Cl.
CPC ............... H02K 7/1807 (2013.01); *Y02E 10/74* (2013.01); H02K 7/183 (2013.01); F03D 3/005 (2013.01); F03D 3/02 (2013.01); F03D 3/04 (2013.01); F03D 3/0427 (2013.01); *Y02E 70/30* (2013.01)

(58) Field of Classification Search
CPC ........ H02K 7/183; H02K 7/1807; F03D 3/02; F03D 3/04; F03D 3/0427; F03D 3/005; Y02E 10/74
USPC ................. 290/44, 66, 55; 416/197 R, 197 A
See application file for complete search history.

(56) References Cited

U.S. PATENT DOCUMENTS

| 3,883,750 | A | * | 5/1975 | Uzzell, Jr. ...................... 290/55 |
| 3,994,621 | A | * | 11/1976 | Bogie ............................ 415/186 |
| 4,486,143 | A | * | 12/1984 | McVey .......................... 415/164 |

(Continued)

FOREIGN PATENT DOCUMENTS

| KR | 10-2008-0113895 A | 12/2008 |
| KR | 10-2009-0004412 A | 1/2009 |

(Continued)

*Primary Examiner* — Pedro J Cuevas
*Assistant Examiner* — Viet Nguyen
(74) *Attorney, Agent, or Firm* — Revolution IP, PLLC

(57) ABSTRACT

Provided is a wind power generating apparatus including a generating tower that has a wall surface in which a plurality of through-holes for inflow of wind are formed, wind inlet walls that protrude outwardly from the respective through-holes so as to guide the inflow of wind, a generating blade that rotates by means of the wind introduced into the generating tower, a generator that generates electricity in conjunction with the rotation of the generating blade, a wind inlet port formed through the respective through-holes formed in the wall surface of the generating tower, and a wind contact member, which is connected to an end of the generating blade, which has a triangular pyramid shape with an open front surface so as to extend the area pressurized by the wind introduced through the wind inlet port, and which has a flow channel dividing member arranged across the open front surface.

4 Claims, 9 Drawing Sheets

(56) References Cited

U.S. PATENT DOCUMENTS

| | | | |
|---|---|---|---|
| 4,935,639 A * | 6/1990 | Yeh | 290/55 |
| 5,997,252 A * | 12/1999 | Miller | 416/197 A |
| 7,172,386 B2 * | 2/2007 | Truong et al. | 415/4.1 |
| 7,288,850 B2 * | 10/2007 | Hicks et al. | 290/44 |
| 7,425,772 B2 * | 9/2008 | Novo Vidal | 290/52 |
| 7,605,491 B1 * | 10/2009 | Chung | 290/55 |
| 8,232,665 B2 * | 7/2012 | Sato | 290/55 |
| 8,461,713 B2 * | 6/2013 | Sammy | 290/55 |
| 8,496,429 B2 * | 7/2013 | Martino | 415/4.4 |
| 2007/0001465 A1 * | 1/2007 | Smith | 290/55 |
| 2008/0050237 A1 * | 2/2008 | Lee | 416/197 A |
| 2008/0179114 A1 * | 7/2008 | Chen | 180/2.2 |
| 2009/0079198 A1 * | 3/2009 | Poo | 290/55 |

FOREIGN PATENT DOCUMENTS

| | | | |
|---|---|---|---|
| KR | 10-2011-0005920 A | 1/2011 | |
| WO | WO 9323669 A1 * | 11/1993 | F03D 3/06 |

* cited by examiner

WIND POWER GENERATING APPARATUS HAVING A WIND GUIDE

CROSS REFERENCE TO PRIOR APPLICATIONS

This application is a National Stage Application of PCT International Patent Application No. PCT/KR2012/000389 filed on Jan. 17, 2012, under 35 U.S.C. §371, which claims priority to Korean Patent Application Nos. 10-2011-0009960 filed on Feb. 1, 2011 and 10-2011-0127753 filed on Dec. 1, 2011, which are all hereby incorporated by reference in their entirety.

TECHNICAL FIELD

The present invention relates to a wind power generating apparatus having a wind guide, and more particularly, to a wind power generating apparatus having a wind guide in which the wind guide is formed into a flared tunnel at a wind inlet port for the inflow of wind such that the wind guide is arranged at an inner surface of the wind inlet port, thereby improving the efficiency of wind power generation.

BACKGROUND ART

In general, wind power generating apparatuses produce electricity using the power of wind that is infinite in nature, and have long been developed and used. In the past, a windmill has been given as an example of an apparatus using the power of wind, and as the interest in environmental pollution has greatly increased lately in the world, a great deal of investment and effort are going into developing eco-friendly wind power generation.

In the wind power generating apparatus, a generating blade is rotated by the inflow of wind and electricity is produced from a generator connected to the generating blade.

As is well known, such a wind power generating apparatus may include a generating blade that is installed horizontally on the ground, a generator that generates electricity in conjunction with the rotation of the generating blade, a generating support that supports so that the generating blade is installed upward from the ground, and a rotary binding member that enables the rotation of the generating blade.

However, the conventional wind power generating apparatus has problems that when wind blows at a wind speed exceeding wind speeds that were considered at the time of design, the generating blade is excessively rotated and causes damage and breakage of other various components as well as the generating blade, and therefore there are difficulties in normal operations of the wind power generating apparatus.

In addition, the conventional wind power generating apparatus has a structure in which only a single generating blade is installed for each generating support, but in this case, actually produced electric energy is small as compared with the cost required for construction of the apparatus, thus causing degradation in production efficiency.

Therefore, Patent No. 10-0984702 entitled "wind power generating apparatus" has been filed and registered by the present applicant. This will be briefly described with reference to FIGS. 1 and 2. The shown wind power generating apparatus includes a generating tower 10 that has a generating space formed therein, a plurality of generating blades 20 that are axially installed along a center of the generating tower 10, wall surface through-holes 14 that penetrate an outer wall of the generating tower 10 and guide the inflow of wind toward the generating blade 20, a windshield plate (reference numeral 12 of FIG. 2) that introduces freely flowing wind around the generating tower 10 toward the wall surface through-holes 14 to concentrate a wind pressure, and a generator 50 that is connected on centric circles through a generating shaft 30 connected to a central axis of each of the plurality of generating blades 20.

In addition, the wind power generating apparatus further includes a horizontal protruding plate 13 that is formed on an outer circumference of the generating tower 10 so as to restrict a vertical flow of wind blowing toward the generating tower 10.

As shown in FIG. 1, in such a wind power generating apparatus, a single generating tower 10 is partitioned into multiple layers (for example, three layers) to obtain a plurality of generating spaces, and the generating space for each layer is divided by the horizontal protruding plate 13. It can be seen that at least one of each of the generating blade 20, the wall surface through-holes 14, the windshield plate (reference numeral 12 of FIG. 2), and the generator 50 is provided within the generating space for each layer.

In addition, the windshield plate (reference numeral 12 of FIG. 12) has a shape that extends in a tangent direction of the generating tower 10 from the point at which the wall surface through-holes 14 are provided and protrudes outward, and therefore wind that flows into a relatively wide space along the windshield plate is increased in pressure and speed while flowing in through the narrow wall surface through-holes 14. At the same time, the wind whose pressure and speed have increased passes through the wall surface through-holes 14 and hits distal ends of edges of the generating blades 20, whereby a rotation speed of the generating blades 20 is accelerated. As a result, efficiency of the wind power generation may be improved.

In this manner, the conventional wind power generating apparatus has an advantage that it can be utilized even in a narrow installation place, and has a structure in which it relatively increases the wind pressure and wind speed and then accelerates the generating blades, and therefore there is an advantage that it can be utilized even when the strength of wind is relatively small. In addition, in response to unexpected changes in the weather such as hurricanes, damage and breakage of the apparatus may be prevented, whereby wind power generation may be consistently performed.

However, the above-described conventional wind power generating apparatus has only a simple structure in which it induces wind flowing around the generating tower to be guided toward an inside of the generating tower so as to allow the guided wind to flow in toward the generating blades. Specifically, there cannot be proposed a method in which the wind blowing toward the generating tower flows via a wind inlet port resulting in a further increase in the strength of the wind, or the wind whose strength has increased efficiently hits the generating blades resulting in an increase in efficiency of wind power generation.

DISCLOSURE

Technical Problem

The present invention is directed to providing a wind power generating apparatus having a wind guide, in which a diamond-shaped wind guide is formed into a flared tunnel at an inner surface of a wind inlet port, so that the wind flowing into the wind inlet port is compressed and accelerated, thereby significantly improving torque of generating blades.

The present invention is also directed to providing a wind power generating apparatus having a wind guide, in which a wind contact member having a triangular pyramid shape with an open front surface is provided at an end of the generating blade so as to extend a contact area pressurized by the wind introduced through the wind inlet port, thereby increasing torque of the generating blade resulting in further improvement in efficiency of the wind power generation.

Technical Solution

One aspect of the present invention provides a wind power generating apparatus including: a generating tower that has a wall surface in which a plurality of through-holes for inflow of wind are formed; wind inlet walls that protrude outwardly from the respective through-holes so as to guide the inflow of wind; a generating blade that rotates by means of the wind introduced into the generating tower; a generator that generates electricity in conjunction with the rotation of the generating blade; a wind inlet port formed through the respective through-holes formed in the wall surface of the generating tower such that a plurality of wind guides are arranged in the lengthwise direction along the inner surface of the wind inlet port, wherein the wind inlet port is formed such that the overall shape thereof is that of a tunnel, the diameter of the outlet of which is smaller than the diameter of the inlet thereof; and a wind contact member, which is connected to an end of the generating blade, which has a triangular pyramid shape with an open front surface so as to extend the area pressurized by the wind introduced through the wind inlet port, and which has a flow channel dividing member arranged across the open front surface so as to accelerate the flow of the introduced wind.

Here, the plurality of wind guides may be arranged in the lengthwise direction so as to be spaced apart from each other along a central angle set along the inner surface of the wind inlet port, a cross-sectional shape of each of the wind guides may be a fan shape, and both inclined planes thereof may be formed into a pointed shape toward the center of the wind inlet port.

In addition, the flow channel dividing member may include upper and lower slant surfaces protruding forward opposite to a direction of the inflow of wind.

In addition, a slit opening in the lengthwise direction of the generating blade may be formed in a rear surface of the wind contact member.

Advantageous Effects

A wind power generating apparatus according to an exemplary embodiment of the present invention maximizes wind power in a state in which wind power facilities are present, and shapes of a wind inlet port and an end of a generating blade which are easy to treat negligently are made different from each other, thereby maximizing generating efficiency due to wind power.

That is, the wind inlet port is formed into a flared tunnel in which the diameter of the outlet thereof is smaller than the diameter of the inlet thereof, whereby introduced wind is strongly compressed to be increased in speed and applied to the generating blade.

Also, a diamond-shaped wind guide is formed on an inner surface of the wind inlet port in the lengthwise direction of the tunnel, so that collectively introduced wind is transmitted up to the generating blade at a high speed, thereby significantly improving a generating function due to an increase in torque of the generating blade.

Furthermore, a flow channel dividing member is arranged across a front surface of a wind contact member so as to accelerate the flow of the introduced wind, so that the flow of the wind introduced toward the wind contact member is vertically divided, the divided wind is joined on a rear surface side of the wind contact member, and then wind added to a narrow inner V-shaped space has strong wind power energy. As a result, torque of the generating blade may be maximized.

In addition, the wind contact member according to the present invention has a triangular pyramid shape with an open front surface, and has a slit opening formed on a rear surface thereof in the lengthwise direction of the triangular pyramid, so that resistance of slip stream wind may be reduced through a narrow opening space, thereby improving efficiency of wind power generation.

MODES OF THE INVENTION

Figure 1:
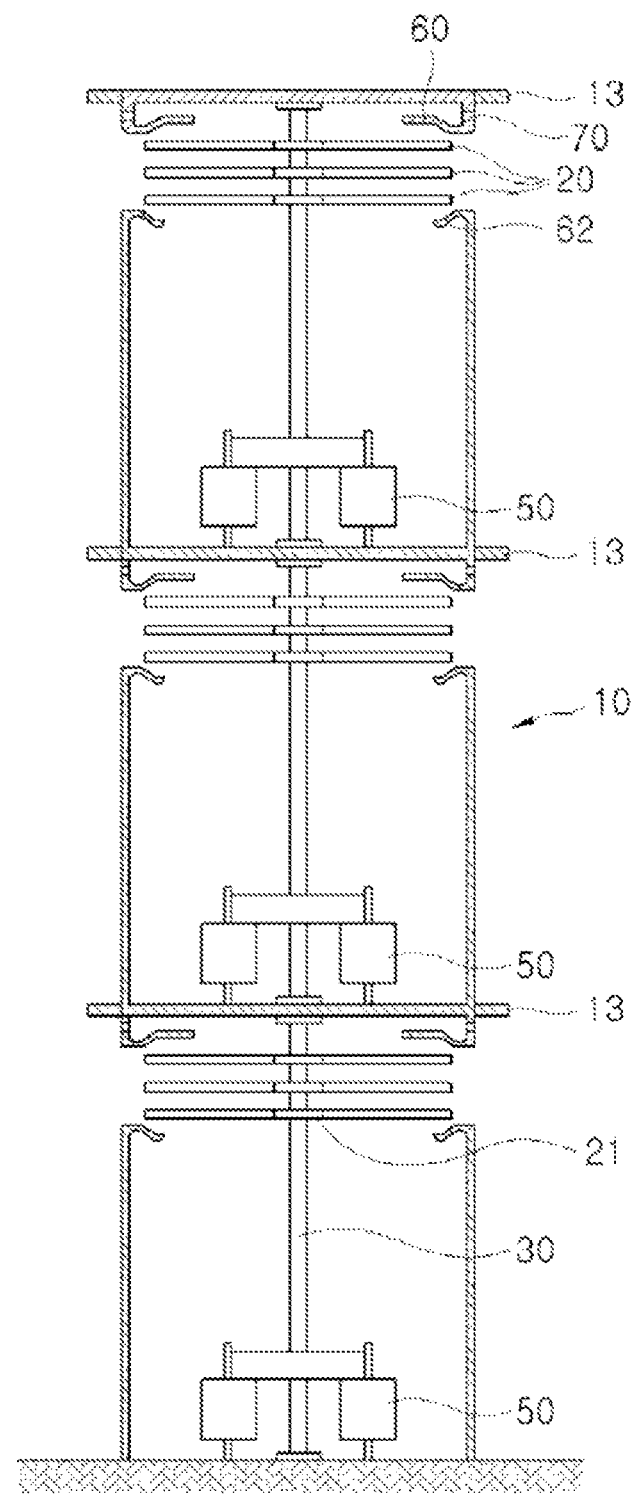
FIG. 1 is a configuration view showing a configuration of a conventional wind guide.

Hereinafter, exemplary embodiments of the present invention will be described in detail. However, the present invention is not limited to the exemplary embodiments disclosed below, but can be implemented in various forms. The following exemplary embodiments are described in order to enable those of ordinary skill in the art to embody and practice the invention.

Prior to detailed description of the present invention, a wind power generating apparatus that has been filed and registered by the present applicant will be briefly described with reference to FIGS. 1 and 2.

The shown wind power generating apparatus includes a generating tower 10 that has a generating space formed therein, a plurality of generating blades 20 that are axially installed along a center of the generating tower 10, wall surface through-holes 14 that penetrate an outer wall of the generating tower 10 and guide the inflow of wind toward the generating blade 20, a windshield plate (reference numeral 12 of FIG. 2) that introduces freely flowing wind around the generating tower 10 toward the wall surface through-holes 14 to concentrate a wind pressure, and a generator 50 that is connected on centric circles through a generating shaft 30 connected to a central axis of each of the plurality of generating blades 20. In addition, the wind power generating apparatus further includes a horizontal protruding plate 13 that is formed on an outer circumference of the generating tower 10 so as to restrict a vertical flow of wind blowing toward the generating tower 10.

Figure 2:
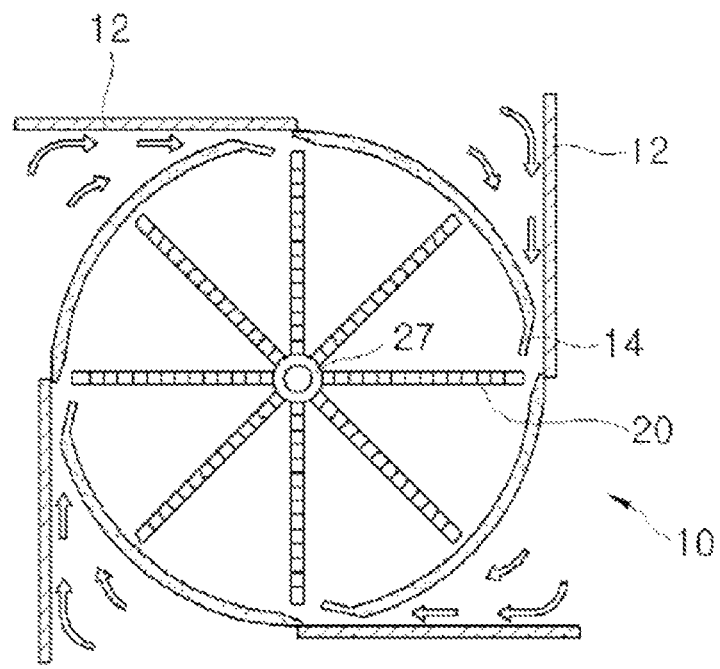
FIG. 2 is a planar configuration view showing a configuration of a conventional wind guide.

As shown in FIG. 1, in such a wind power generating apparatus, a single generating tower 10 is partitioned into multiple layers (for example, three layers) to obtain a plurality of generating spaces, and the generating space for each layer is divided by the horizontal protruding plate 13.

It can be seen that at least one of each of the generating blade 20, the wall surface through-holes 14, the windshield plate (reference numeral 12 of FIG. 2), and the generator 50 is provided within the generating space for each layer. In addition, the windshield plate (reference numeral 12 of FIG. 12) has a shape that extends in a tangent direction of the generating tower 10 from the point at which the wall surface through-holes 14 are provided and protrudes outward, and therefore wind that flows into a relatively wide space along the windshield plate is increased in pressure and speed while flowing in through the narrow wall surface through-holes 14. At the same time, the wind whose pressure and speed have increased passes through the wall surface through-holes 14 and hits distal ends of edges of the generating blades 20, whereby a rotation speed of the generating blades 20 is accelerated.

Here, for the purpose of increasing a speed of the wind introduced through the wall surface through-holes 14 and increasing torque of the generating blade 20 by the introduced wind, there is provided a wind power generating apparatus having a wind guide according to the present invention.

Hereinafter, a configuration and effect of the present invention will be described in more detail with reference to the accompanying drawings.

Figure 3:
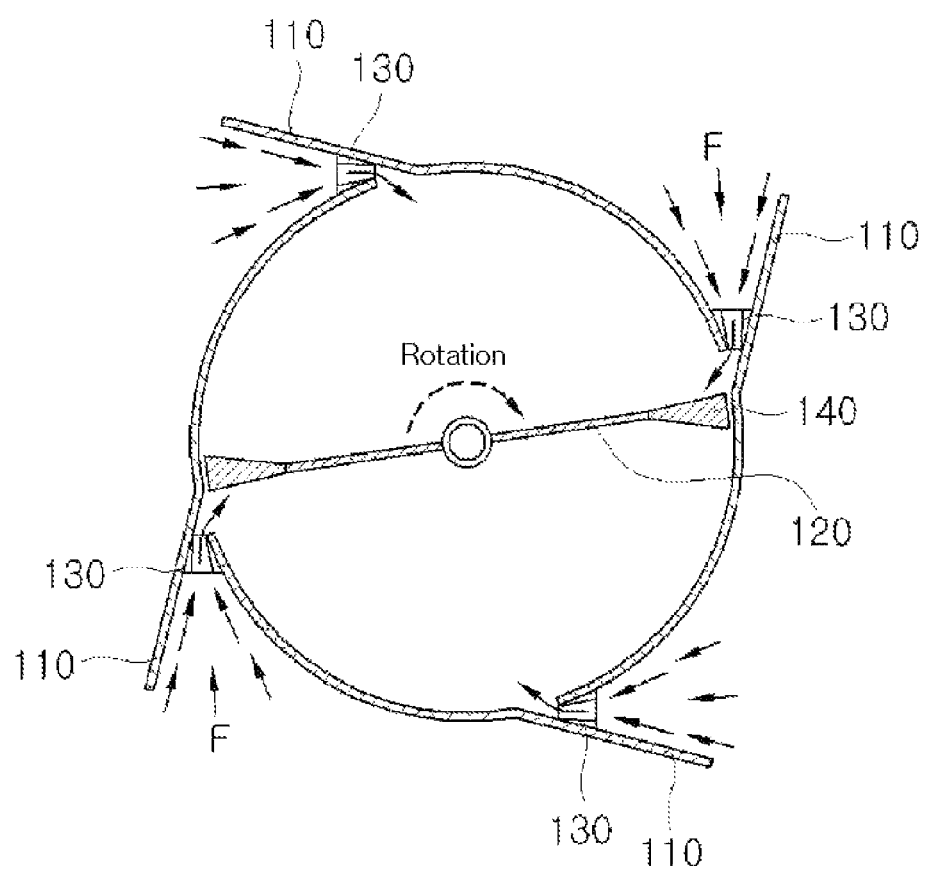
FIG. 3 is a planar configuration view showing a configuration of a wind power generating apparatus having a wind guide according to an embodiment of the present invention.
Figure 4:
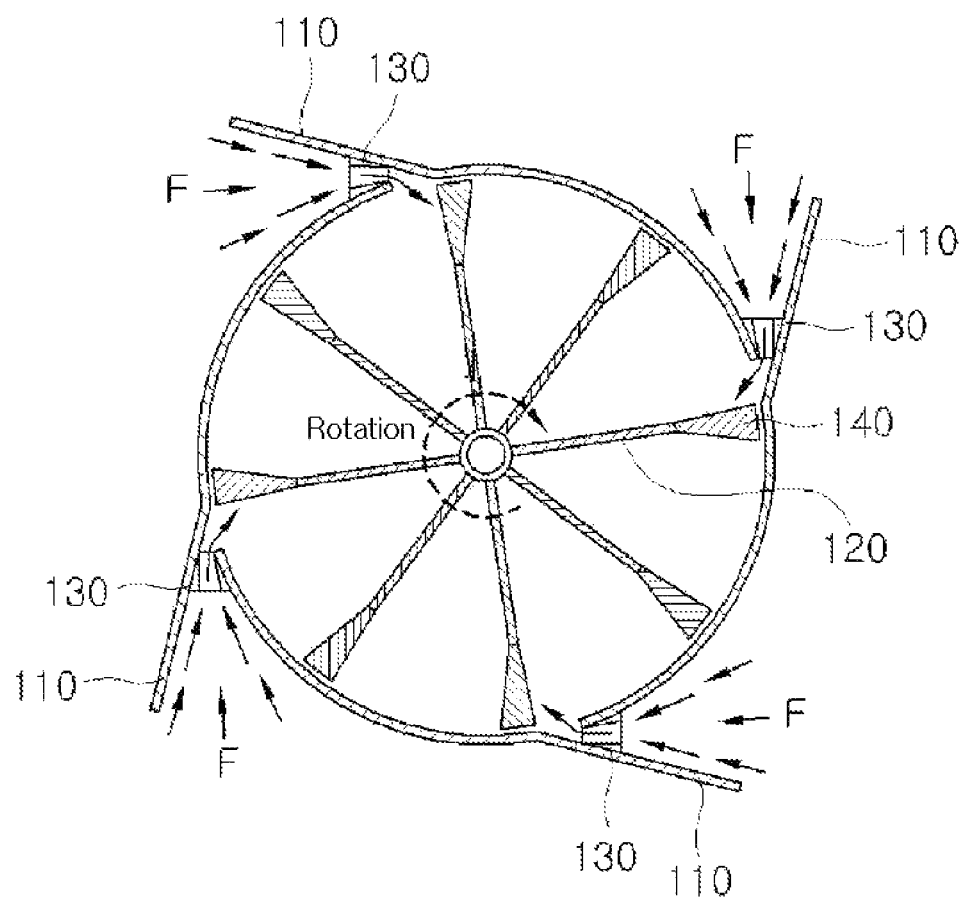
FIG. 4 is a planar configuration view showing a modification example of a wind power generating apparatus having a wind guide according to an embodiment of the present invention.

FIG. 3 is a planar configuration view showing a configuration of a wind power generating apparatus having a wind guide according to an embodiment of the present invention, and FIG. 4 is a planar configuration view showing a modification example of a wind power generating apparatus having a wind guide according to an embodiment of the present invention.

As shown, the wind power generating apparatus having the wind guide according to an embodiment of the present invention includes a generating tower (reference numeral 10 of FIG. 1) that has a wall surface in which a plurality of through-holes (reference numeral 14 of FIG. 1) for inflow of wind are formed, wind inlet walls 110 that protrude outward from the respective through-holes so as to guide the inflow of wind, a generating blade 120 that rotates by means of the wind introduced into the generating tower, a generator (reference numeral 50 of FIG. 1) that generates electricity in conjunction with the rotation of the generating blade, a wind inlet port 130 formed through the respective through-holes formed in the wall surface of the generating tower, and a wind contact member 140 which is connected to an end of the generating blade 120.

However, in FIG. 3, an example in which the generating blades 120 are symmetrically formed about the center of rotation, and an angle between the blades 120 is 180° is shown, and in FIG. 4, an example in which the generating blades 120 are symmetrically formed about the center of rotation is shown, but the angle between the generating blades 120 is 45°.

Here, the wind inlet port 130 may indicate a tunnel area formed so as to gather wind F flowing around the wind inlet walls 110 by the wind inlet walls 110 and then allow the gathered wind F to flow up to an inside of the generating tower, and for this, the wind inlet port 130 penetrates the wall surface of the generating tower. In addition, the wind inlet port 130 guides the wind F introduced into the inside to the wind contact member 140 provided on the end of the generating blade 120.

As shown, the wind contact member 140 is a member connected to the end of each of the generating blades 120, and has a shape that extends an area pressurized by the flow of wind so that the wind contact member more effectively receives power opposite to the wind introduced through the wind inlet port 130 as described above so as to be rotated. The specific description will be described with reference to FIGS. 7 and 8.

Figure 5:
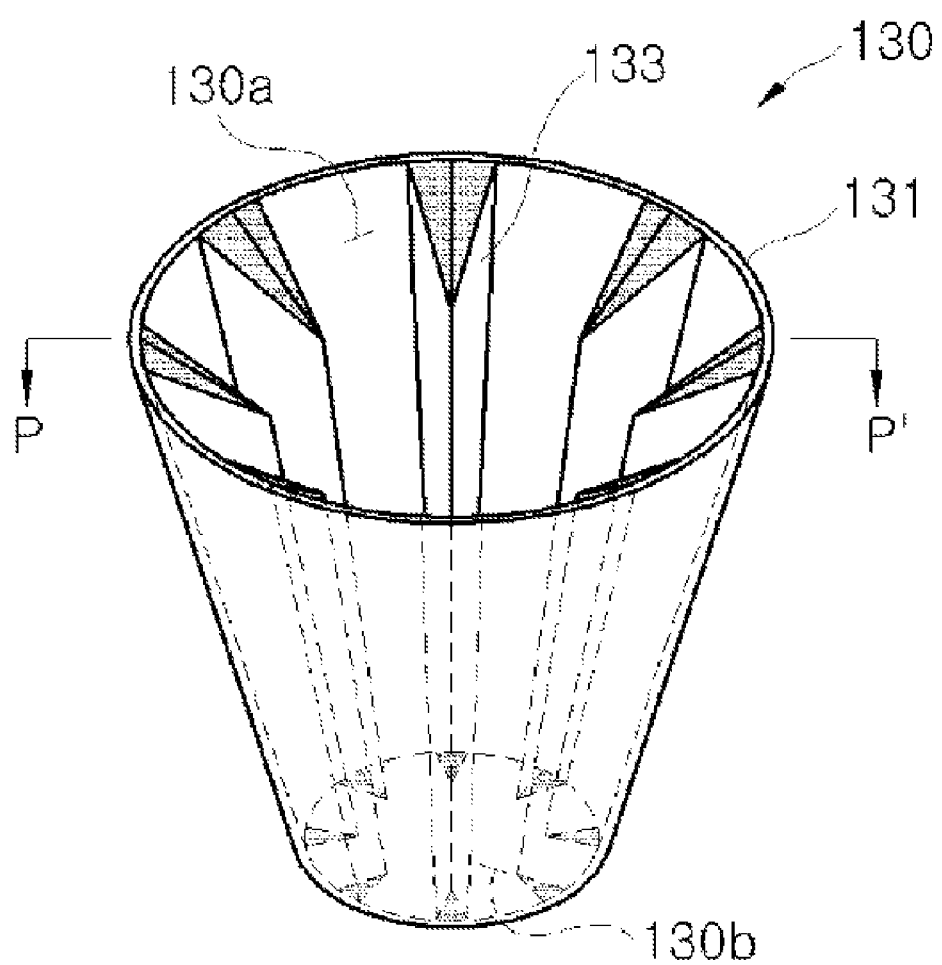
FIG. 5 is a perspective view showing a wind inlet port of a wind power generating apparatus having a wind guide according to an embodiment of the present invention.
Figure 6:
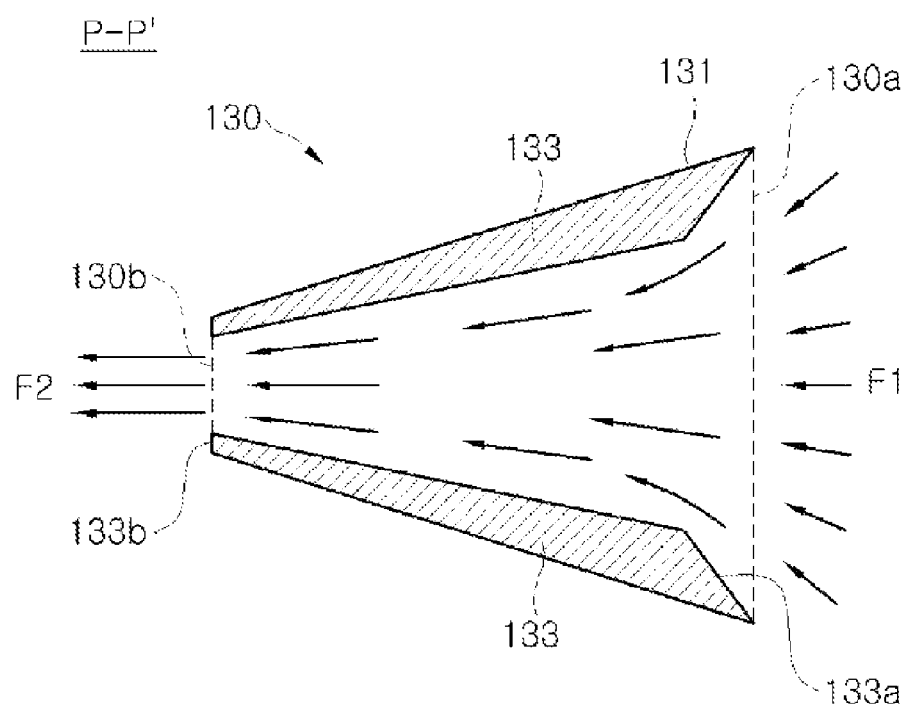
FIG. 6 is a view briefly showing a cross-sectional structure for explaining effects of the wind inlet port shown in FIG. 5.

Next, FIG. 5 is a perspective view showing a wind inlet port of a wind power generating apparatus having a wind guide according to an embodiment of the present invention, and FIG. 6 is a view briefly showing a cross-sectional structure for explaining effects of the wind inlet port shown in FIG. 5.

As shown, the wind inlet port 130 is formed into a tunnel in which a diameter of an outlet 130b thereof is smaller than a diameter of an inlet 130a thereof, and is referred to as a flared tunnel (or conical tunnel). A plurality of wind guides 133 are arranged in the lengthwise direction of the wind inlet port 130, and the respective wind guides 133 are spaced apart from each other at set intervals along an inner wall 131 of the wind inlet port 130. Thus, the inside of the wind inlet port 130 has a wide top and narrow bottom shape, and therefore a wind speed is dramatically increased while wind introduced toward the inlet 130a that is an upper side on the drawing passes through the wind inlet port 130 and then is discharged toward the outlet 130b. As a result, wind power applied to the generating blade is strengthened to improve efficiency of wind power generation.

FIG. 6 is an enlarged view showing a P-P' cross section of FIG. 5. As shown, wind F1 introduced toward the inlet 130a of the wind inlet port 130 is increased in strength on the outlet 130b due to a structure of the flared tunnel and a cross-sectional structure of the plurality of wind guides 133, and wind F2 increased in speed is discharged. In particular, an outlet cross-section 133b of each of the wind guides 133 has a shape orthogonal to the flow direction of the wind, but an inlet cross-section 133a thereof has an inward inclined shape so that the inflow of wind is smoothly carried out. A three-dimensional (3D) shape of such wind guides 133 can be found through FIG. 7.

Figure 7:
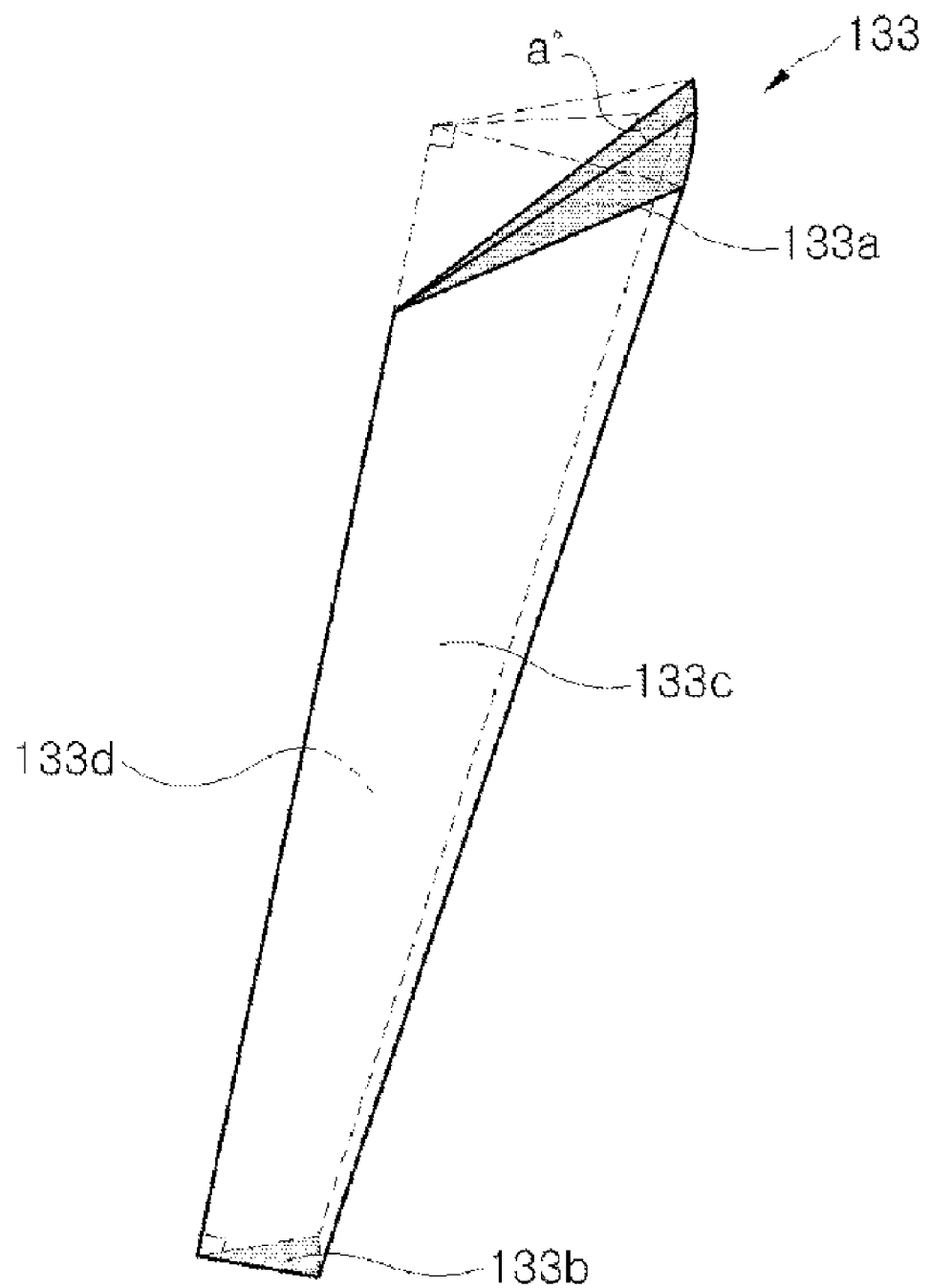
FIG. 7 is a perspective view briefly showing a wind guide of a wind power generating apparatus having the wind guide according to an embodiment of the present invention.

FIG. 7 is a perspective view briefly showing a wind guide of a wind power generating apparatus having the wind guide according to an embodiment of the present invention. As shown, the outlet cross-section 133b of the wind guide 133 has a shape orthogonal to the lengthwise direction, but the inlet cross-section 133a of the wind guide 133 is formed so as to be inclined inward by a°. In addition, such an inlet cross-section 133a is formed in such a manner that both surfaces thereof from the center line are inclined at a constant angle (for example, a diamond shape). Such a shape is used to reduce a loss of wind energy in such a manner that the wind introduced through the wind inlet port hits the inlet cross-section 133a of the wind guide 133.

In addition, a cross-section of a body of the wind guide 133 has a fan shape. Thus, both inclined planes 133c and 133d thereof are formed into a straight plane pointed toward the center of the wind inlet port, and therefore the friction of wind flowing along the wind guide 133 may be reduced.

Figure 8:
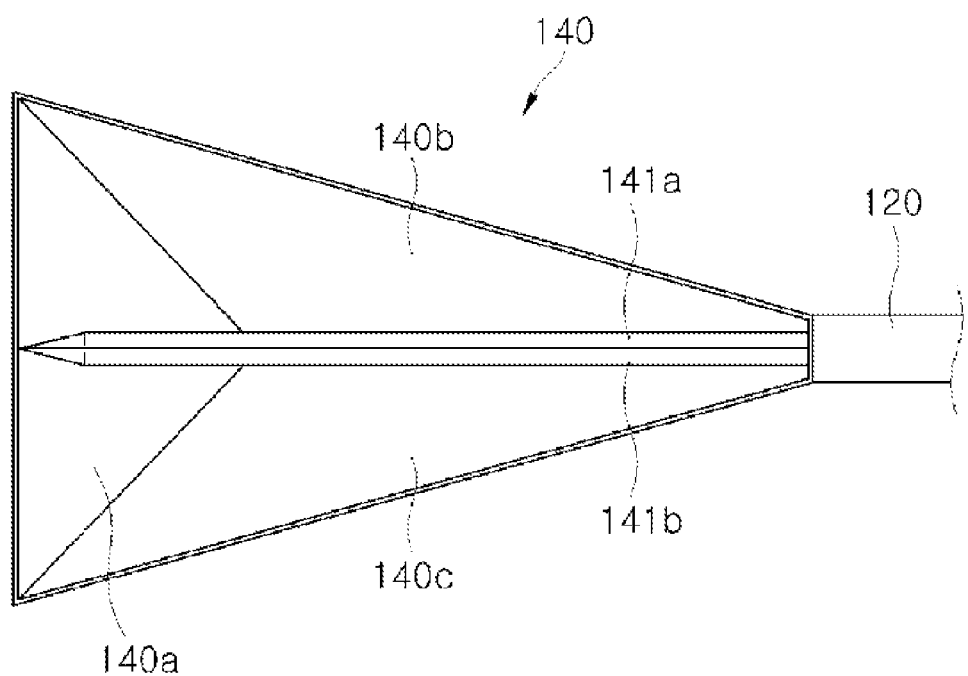
FIG. 8 is a front view briefly showing a wind contact member of a wind power generating apparatus having a wind guide according to an embodiment of the present invention.

FIG. 8 is a front view briefly showing a wind contact member of a wind power generating apparatus having a wind guide according to an embodiment of the present invention.

As shown in FIG. 8, the wind contact member 140 is connected through the end of the generating blade 120.

The wind contact member 140 may have an accommodation space for accommodating wind introduced through the above-described wind inlet port 130, and for this, has a triangular pyramid shape with an open front surface so that the area pressurized by the wind may be maximally enlarged. The wind contact member 140 includes a flow channel dividing member (141 of FIG. 9) that is arranged across the open front surface. Such a flow channel dividing member vertically divides the flow of wind introduced toward the wind contact member 140, temporarily accelerates the wind speed on the front side of the wind contact member 140, and then joins the divided wind again, and thereby the wind speed applied to the wind contact member 140 may be increased.

In particular, the flow channel dividing member (141 of FIG. 9) is arranged across the front of the accommodation space of the wind contact member 140 opposite to the direction of the inflow of wind. Here, as can be seen in FIG. 8, the flow channel dividing member may extend in a straight line relative to the lengthwise direction of the generating blade 120. In addition, such a flow channel dividing member includes upper and lower slant surfaces 141a and 141b protruding forward opposite to a direction of the inflow of wind. The upper and lower slant surfaces 141a and 141b protrude in a pointed shape at their ends, and the direction of the flow of wind is divided into upper and lower directions through the upper and lower slant surfaces 141a and 141b as boundaries, and therefore the wind in the upper and lower directions is respectively accelerated. The wind divided into the upper and lower directions is applied to a second surface 141b and a third surface 141c of the wind contact member blocked on the upper and lower sides, so that strong wind power may act on the wind contact member 140. In this instance, the first surface 141a of the wind contact member is a bottom surface of a triangular pyramid that connects and seals the second surface 141b and the third surface 141c. On a rear surface of the wind contact member, a slit opening in the lengthwise direction is formed. Here, the slit denotes a long hole in which a width of the open area is narrow and a length is relatively long. Description of the slit will be made with reference to FIG. 9.

Figure 9:
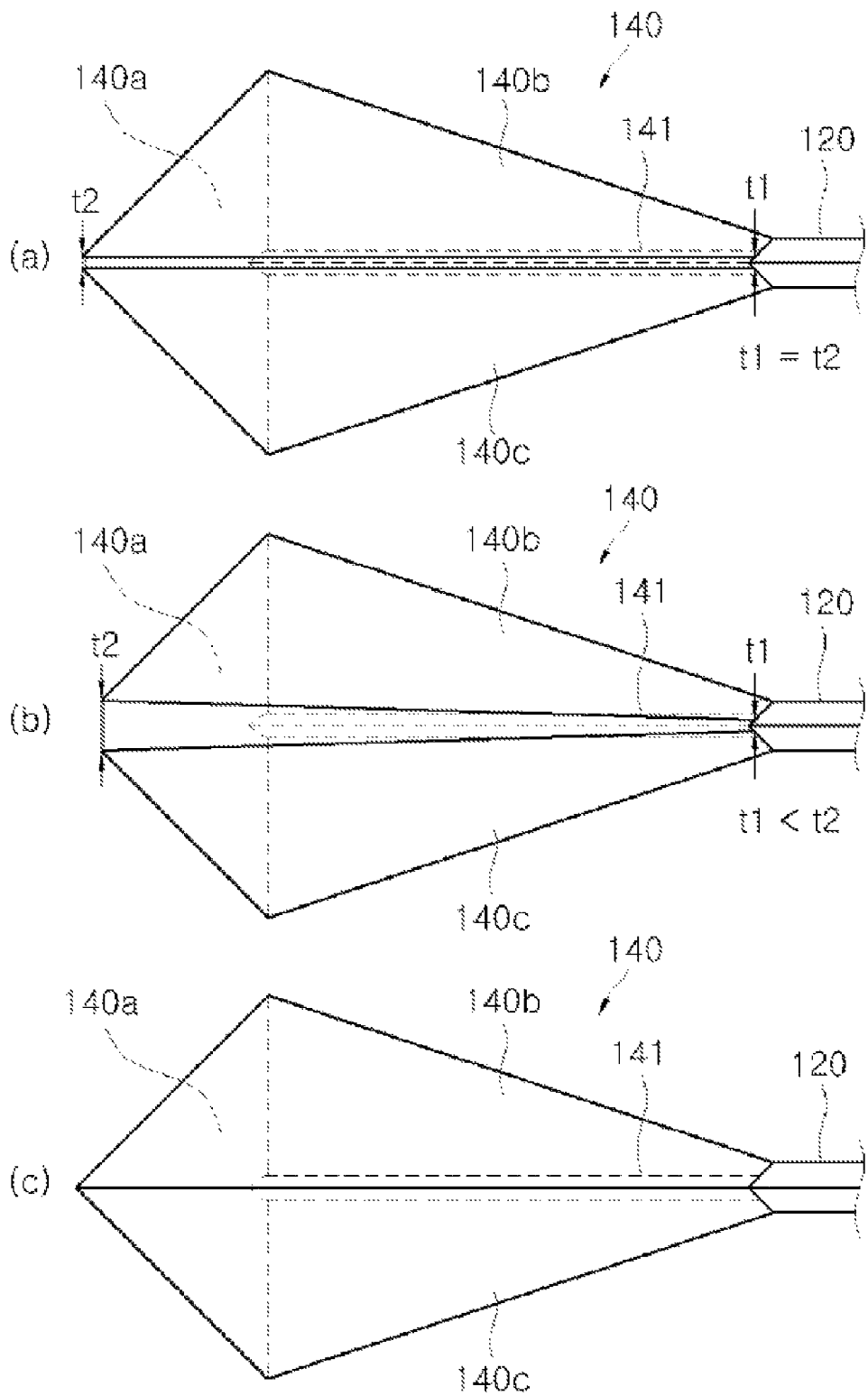
FIG. 9 is a rear view showing various examples of a wind contact member of a wind power generating apparatus having a wind guide according to an embodiment of the present invention.

FIG. 9 is a rear view showing various examples of a wind contact member of a wind power generating apparatus having a wind guide according to an embodiment of the present invention.

As shown, a shape of a rear surface of the wind contact member 140 may be classified into three types. First, in (a) of FIG. 9, there is disclosed the wind contact member 140 of which the slit has the same width at both ends in the lengthwise direction of the wind contact member 140 (t1=t2). In (b) of FIG. 9, there is disclosed the wind contact member 140 in which a width (t2) of the slit on the first surface 141a side of the wind contact member 140 is larger than a width (t1) of the slit on the generating blade 130 side so as to be inclined (t1<t2). In (c) of FIG. 9, there is disclosed the wind contact member 140 in which the slit is not formed on the rear surface of the wind contact member 140 and the first surface 141a, the second surface 141b, and the third surface 141c of the wind contact member 140 are all connected tangentially.

By properly using the shapes of the rear surface of the wind contact member 140, adverse wind acting as resistance on the rear side of the wind contact member 140 that rotates is partially communicated, and therefore air resistance may be reduced or occurrence of vertical vibration due to air friction on the rear side of the wind contact member 140 when the wind contact member 140 is rotated may be suppressed.

However, when sizes of the opened widths t1 and t2 are excessively large, energy loss of wind power acting on the front side of the wind contact member 140 may be increased, and therefore it is desirable that the sizes of the opened widths t1 and t2 as well as whether the slit is opened be appropriately selected considering design values of the generating blade 120 and the wind contact member 140.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A wind power generating apparatus comprising:
    a generating tower that has a wall surface in which a plurality of through-holes for inflow of wind are formed;
    wind inlet walls that protrude outwardly from the respective through-holes so as to guide the inflow of wind;
    a generating blade that rotates by means of the wind introduced into the generating tower;
    a generator that generates electricity in conjunction with the rotation of the generating blade;
    a wind inlet port and a wind outlet port being formed into a tunnel and a plurality of wind guides formed in a longitudinal direction along an inner surface of the wind inlet port, each wind guide having an inlet and outlet ports and being arranged spaced apart from each other at a predetermined interval, a first end of the wind inlet port having a wide circle which corresponding to the inlet port of the wind guides and a second end of the wind outlet port having a narrow circle which corresponding to the outlet port of the wind guides, wherein
    a cross-section of the inlet port of each wind guide is formed inwardly-inclined to a wind flow direction of the wind inlet port and a cross-section of each outlet portion is formed in a right angle to the wind flow direction of the wind outlet port; and
    a wind contact member, being connected to an end of the generating blade, formed in a triangular pyramid shape having an open front surface corresponding to the wind inlet port, and a flow channel dividing member extending in a horizontal direction, the flow channel dividing member including an upper and a lower slant surfaces formed protruding forward opposite to the wind flow direction of the wind inlet port so as to accelerate the flow of the wind inlet port.

2. The wind power generating apparatus of claim 1, wherein a cross-sectional shape of each of the wind guides is a fan shape, and both inclined planes thereof are formed into a pointed shape toward the center of the wind inlet port.

3. The wind power generating apparatus of claim 1, wherein the flow channel dividing member is configured to vertically divide the flow of wind introduced toward the wind contact member, to accelerate the wind speed on the front side of the wind contact member, and then to join the divided wind again, wherein the wind speed applied to the wind contact member is increased.

4. The wind power generating apparatus of claim 1, wherein the wind contact member selectively includes a slit opening in a longitudinal direction of the generating blade which is formed in a rear surface of the wind contact member, and wherein a size of the slit is either uniformly formed or gradually decreased along the longitudinal direction to the generating blade.

* * * * *